Feb. 15, 1938.   N. H. SAUNDERS   2,108,143
MOTOR STARTING SYSTEM
Filed Aug. 2, 1935
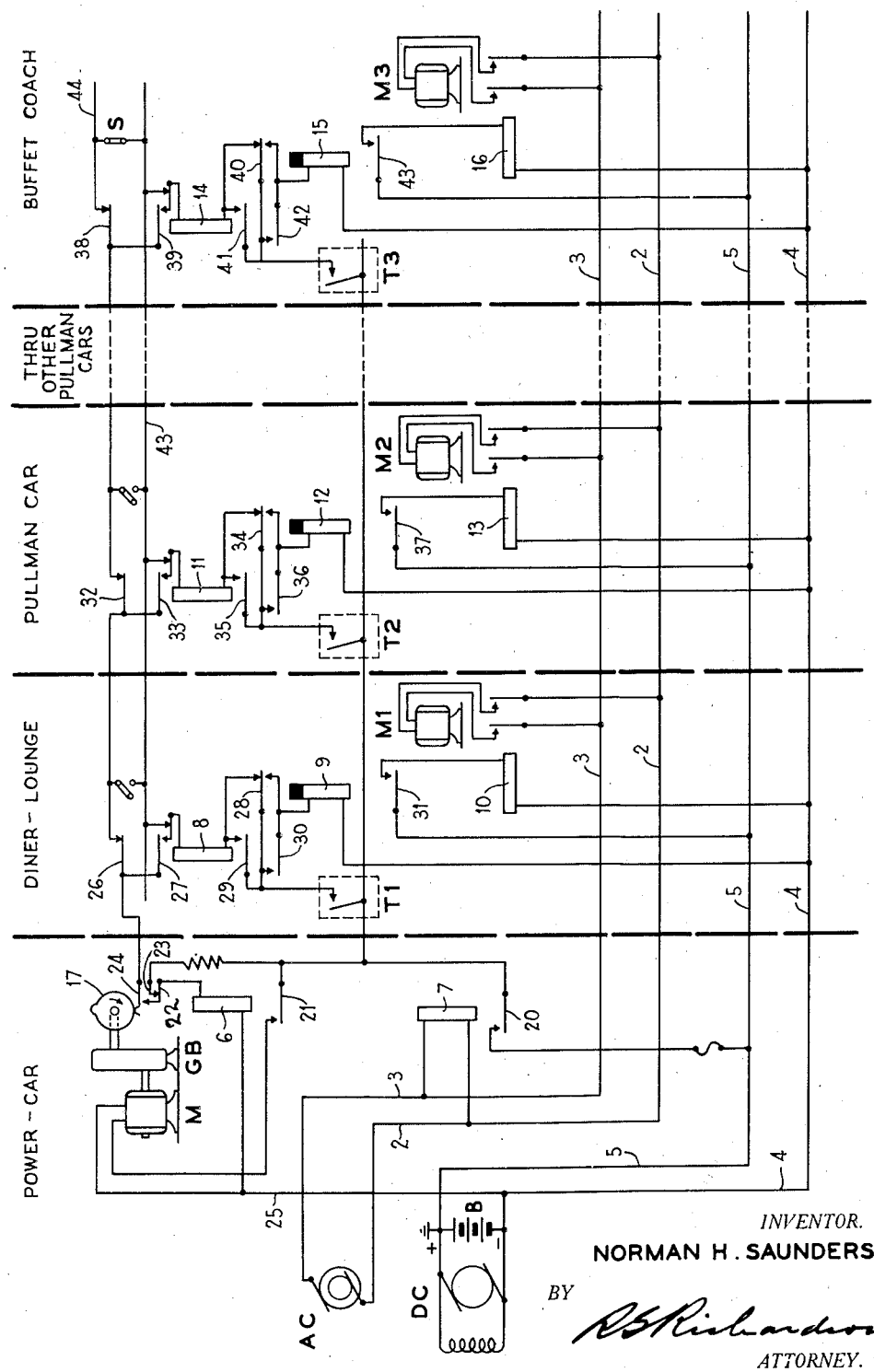
INVENTOR.
NORMAN H. SAUNDERS
BY
ATTORNEY.

Patented Feb. 15, 1938

2,108,143

UNITED STATES PATENT OFFICE 2,108,143

MOTOR STARTING SYSTEM

Norman H. Saunders, Chicago, Ill., assignor, by mesne assignments, to Associated Electric Laboratories, Inc., Chicago, Ill., a corporation of Delaware Application August 2, 1935, Serial No. 34,355

11 Claims. (Cl. 172—239)

The present invention relates in general to motor starting systems, and the object of the invention, briefly stated, is to provide an arrangement whereby a plurality of motors which are started under automatic control, as by means of thermostats, and which tend to start simultaneously, are made to start successively at sufficient intervals to avoid an overload on the power circuit.

The particular embodiment of the invention which is described herein has been especially designed for controlling the starting of the motors which drive the air conditioning equipment on a modern high speed passenger train.

The invention is illustrated in the accompanying drawing which shows diagrammatically the circuits and apparatus involved.

Referring to the drawing, the circuit diagram has been divided into sections by means of dotted lines to indicate the location of the various relays and other equipment with respect to the different parts of the train, these parts being appropriately labeled in the drawing. It will be understood that the detailed makeup of the train specified is by way of example only and to assist in a clear explanation of the invention.

In the power car of the train there may be an alternating current generator, labeled AC in the drawing, which supplies current for operating the motors of the air conditioning equipment. There may be an individual air conditioning equipment in each passenger car, with its own individual motor. The power leads 2 and 3, therefore, extend from the generator AC through the train so that the power supply is available in each car. The motors are indicated in the drawing as M1, M2, and M3, and are adapted to be connected to power leads 2 and 3 by means of relays 10, 13, and 16, respectively. For the sake of simplicity a single phase power circuit has been shown, but it is obvious that other circuits could be used, as for instance, a three phase circuit.

There may also be in the power car a direct current generator DC and a storage battery B, the main purpose of which is to supply the lighting system of the train over the leads 4 and 5. This supply of direct current may be conveniently used for operating the relays shown and also for operating a small motor M.

The motor M should be of the constant speed type, although the maintenance of an exact speed is not essential. It drives a cam 17 through the medium of a gear box GB at a speed determined by the time required for one of the air conditioning motors to attain approximately normal running condition when started from rest. This time may range from 5 or 10 seconds to one minute or more.

As mentioned hereinbefore the starting of the air conditioning motors is automatically controlled. This may be effected by means of thermostats, of which there is one in each car provided with air conditioning equipment. In the drawing the thermostats are indicated by reference characters T1, T2, and T3.

In order to explain the operation of the system, it will be assumed that a train equipped in accordance with the invention has been standing idle on a siding and is taken out for a run. While the train is standing on the siding the generator AC is not running and the air conditioning equipment does not function. If the temperature is high, as will be assumed is the case, the air conditioning equipment will be needed at once in order to lower the temperature within the cars of the train and prepare them for occupancy. It follows, therefore, that the thermostats T1, T2, and T3 will have closed, due to the high temperature in the cars.

When the train is taken out the generators AC and DC are started in operation. With the generator AC running power is supplied to leads 2 and 3. The alternating current relay 7 accordingly energizes and holds up as long as the supply of power continues. In energized position relay 7 closes a circuit for relay 6 which extends from lead 5 by way of 20, 23, 22, 6, and 25 to lead 4. Upon energizing, relay 6 closes a circuit for motor M which extends from lead 5 by way of 20, 21, M, and 25 to lead 4. The motor M accordingly starts up and rotates cam 17.

After a short interval the cam 17 will force spring 24 against spring 22, separating the latter from spring 23. A circuit is thereupon completed for relays 8, 11, and 14 in parallel, said circuit extending from the lead 5 by way of 20, thermostats T1, T2, and T3 (now closed) in parallel, 28, 34, and 40 in parallel 8, 11, and 14 in parallel, 43, S, 38, 32, 26, 24, 22, 6, and 25 to lead 4. Over the above circuit relay 6 is maintained energized and relays 8, 11, and 14 are energized. The latter relays are adjusted to close their contacts such as 27 before breaking their contacts such as 26. Relay 8, upon energizing, locks itself in the circuit at 27 and 29, and at 26 breaks the chain circuit 26, 32, and 38 over which the three relays 8, 11 and 14 were initially energized. Relays 11 and 14 therefore fall back and only relay 8 is fully operated.

Relay 8 remains operated while springs 24 and 22 are in contact, and falls back upon the separation of these springs due to the continued rotation of cam 17. While in operated position relay 8 closes an obvious circuit for slow to energize relay 9 at 30. It may be pointed out here that the corresponding relays 12 and 15 do not respond to the partial energization of relays 11 and 14, since these relays close their contacts 36 and 42 only momentarily. Relay 8, however, holds contact 30 closed long enough to effect the operation of relay 9, which locks itself at 28 and at the same point breaks the initial energizing circuit of relay 8. Relay 9 also closes a circuit at 31 for relay 10. The latter relay, upon energizing, connects up motor M1 to the power leads 2 and 3, and the motor starts up.

The cam 17 continues its rotation and after the lapse of a certain interval again closes the described circuit including springs 24 and 22. This time, however, since relay 9 is energized, the circuit includes relays 11 and 14 in parallel and excludes relay 8. Relays 11 and 14 accordingly energize. Relay 11 locks itself at 33 and 35, and breaks the chain at 32 so that relay 14 immediately falls back. Relay 11 stays up until cam 17 passes beyond spring 24, and closes a circuit for relay 12 at 36. Relay 12, upon energizing, breaks the initial energizing circuit of relay 11 at 34, locks itself at 34, and closes a circuit for relay 13 at 37. Upon energizing, relay 13 starts up the motor M2.

The next time the cam 17 closes springs 24 and 22 a circuit is closed for relay 14 alone, since relays 9 and 12 are in energized position. On energizing, relay 14 performs the same functions as described in connection with the preceding relays, including the closing of a circuit for relay 15. The latter relay breaks the initial energizing circuit of relay 14 at 40, locks itself at 40, and at 43 closes a circuit for relay 16. Relay 16 therefore energizes and starts up the motor M3.

It will be seen from the foregoing that although all the thermostats T1, T2, and T3 were closed at the time the generator was started up, the motors M1, M2, and M3 are nevertheless started up consecutively, one at a time, which avoids placing an overload on the generator. The motors continue to run and the air conditioning equipment will gradually reduce the temperature. As the temperature reaches the desired point in each car the associated thermostat such as T1 will open up, breaking the locking circuit of the associated relay such as 9. Relay 9 on falling back breaks the circuit of relay 10 to stop motor M1. After a while all these relays 9, 12, and 15 will become deenergized, and all the air conditioning motors will be stopped.

The apparatus may stay in this condition for a while but before long the cars will get too warm again and the thermostats will begin to close. Due to different conditions affecting the cars the thermostats will generally close at different times, but it may happen that several of them will close together, or within the interval determined by one rotation of cam 17. The equipment functions to start each motor responsive to the closing of its thermostat, and if two thermostats close in the same interval it insures that the motors are started successively.

Suppose for instance that the thermostat T2 closes, T1 and T3 remaining open. The next time cam 17 closes springs 24 and 22 a circuit will be closed for relay 11, which operates and stays up while springs 24 and 22 remain in contact, closing a circuit for relay 12. The latter relay locks, opens the initial circuit of relay 11, and closes a circuit for relay 13. Relay 13 pulls up and starts motor M2.

Assume on the other hand that thermostats T2 and T3 close simultaneously. When cam 17 closes springs 24 and 22, relays 11 and 14 will energize, but only relay 11 will remain up long enough to close a circuit for the associated relay such as 12. Accordingly only motor M2 is started up, the starting up of motor M3 being postponed until the cam 17 comes around again.

The thermostats will rarely close simultaneously, after the equipment has once been started up, but it will happen quite often that after one thermostat has closed, a second thermostat will close within the same rotation of cam 17. For instance assume that thermostat T3 closes and that shortly after the next closure of springs 24 and 22, the thermostat T1 closes. The motor M3 will be started in the described manner responsive to the closure of T3 followed by the closure of springs 24 and 22. Now the closure of T1, whether it occurs while the springs 24 and 22 are still closed or after they have separated, cannot result in the immediate starting of motor M1. If springs 24 and 22 are still closed when T1 closes, the relay 14 will be up and the chain will be open at 38, so that relay 8 cannot energize. If the springs 24 and 22 have separated before T1 closes, then relay 8 cannot energize because its circuit is open at 24—22 and it has to wait until these springs are again closed by the cam 17.

Attention is directed to the fact that the control equipment involving relays such as 8, 9, and 10 is exactly the same in each passenger car, which makes it possible to couple the cars in the train in any desired order, or to cut out and insert cars at will without interfering with the operation of the control system. Only three conductors in addition to the power leads have to be run through the train. In connecting up the system when a train is made up the conductor such as 44 in the last car has to be connected to conductor 43. Each car may be provided with a switch S to accomplish this. The switch S in the last car is operated and the corresponding switches in the other cars are left open. Of course the coupling arrangements may be so designed as to take care of this automatically if desired.

The invention having been described, that which is believed to be new and for which the protection of Letters Patent is desired will be pointed out in the appended claims.

What is claimed is:

1. In a motor starting system, a plurality of motors, a plurality of thermostats, one for starting each motor, and means including a periodic circuit closer for rendering simultaneously operated thermostats effective to start their associated motors at spaced intervals.

2. In a motor starting system, a plurality of motors, an individual starting device for each motor, a periodically operated contact maker including a pair of contacts, means for starting any motor responsive to the closure of said contacts provided its individual starting device has been closed, and means effective if a plurality of starting devices have been closed for causing the associated motors to start responsive to successive closures of said contacts.

3. In a motor starting system, a plurality of motors, a start control circuit, means for sending spaced impulses over said circuit, and means responsive to successive impulses for starting said motors successively.

4. In a motor starting system, a plurality of motors, a start control circuit, means for sending spaced impulses over said circuit, individual starting switches for said motors, and means for causing each of a plurality of successive impulses to operate a different starting switch.

5. In a motor starting system, a plurality of motors, a start control circuit, means for sending spaced impulses over said circuit, a primary starting switch for each motor, and means for causing all motors that have their starting switches closed to start in a predetermined order responsive to successive impulses over said control circuit.

6. In a motor starting system, a plurality of starting switches, a plurality of relays controlled by said switches, respectively, means for energizing said relays simultaneously at a time when all said switches are closed, circuit arrangements for maintaining only one relay energized and for promptly deenergizing the other relays, and delayed action motor starting means associated with each relay requiring a prolonged energization thereof to become effective.

7. In a motor starting system, a series of relays, a chain circuit extending through series contacts on said relays, means including said chain circuit for energizing said relays simultaneously, thereby breaking the chain circuit at each relay, contacts on each relay for locking itself to the chain circuit at a point where the continuity of the circuit is dependent only on the preceding relays if any, whereby only the first relay in the series is able to close an effective locking circuit, a motor starting switch controlled by each relay, and means whereby the operation of any starting switch is made dependent upon the energization and effective locking of the associated relay.

8. In a motor starting system, a motor, a relay, a starting switch, a circuit for said relay including said switch, means for periodically completing said circuit at another point, whereby the relay is energized if said switch is closed, a self locking relay energized by said first relay, and contacts on said locking relay for opening the circuit of said first relay and for starting said motor.

9. In a motor starting system, a primary starting switch, a relay, a timing device, a circuit for said relay including said switch and timing device, a second relay, a circuit for said second relay closed by said first relay, a locking circuit for said second relay including said switch, contacts in said second relay for breaking the circuit of said first relay, a motor, and a main switch for said motor controlled by said second relay.

10. In a motor starting system, a plurality of starting switches, each operable between a first position and a second position, a plurality of relays respectively controlled by said switches, each of said relays being operable between a first position and a second position, means for causing said relays simultaneously to be operated to their respective first positions when all of said switches stand in their respective first positions, means responsive to the operation of one of said relays to its said first position for causing the other of said relays to be returned to their respective second positions, and delayed action motor starting means associated with each relay and requiring the maintenance of the associated relay in its said first position for a prolonged time interval to become effective.

11. In a motor starting system, a motor, a first relay, a second relay, each of said relays being operable between a first position and a second position, a starting switch, a circuit for said first relay including said switch, means for periodically altering the condition of said circuit at another point whereby said first relay is operated from its second position to its first position only if said switch is closed, said second relay being adapted to be operated from its second position to its first position in response to the operation of said first relay to its said first position; and means responsive to the operation of said second relay to its said first position for retaining said second relay in its said first position, for causing said first relay to be returned to its said second position, and for starting said motor.

NORMAN H. SAUNDERS.